United States Patent [19]

Koyama et al.

[11] 4,316,969

[45] Feb. 23, 1982

[54] CURED NOVOLAK FIBER-REINFORCED, CHLORINATED RUBBER MOLDED ARTICLES HAVING EXCELLENT FLAME-PROOFNESS, AND PROCESS FOR THE PREPARATION THEREOF

[75] Inventors: Hiroaki Koyama; Shigeo Shimizu, both of Osaka; Mituru Sekiya, Tokyo, all of Japan

[73] Assignee: Nippon Kynol Incorporated, Osaka, Japan

[21] Appl. No.: 55,191

[22] Filed: Jul. 2, 1979

[51] Int. Cl.³ .................... C08L 11/00; C08L 15/02; C08L 23/28; C08L 61/04

[52] U.S. Cl. .................................... 525/145; 260/3.3; 264/137; 264/257; 525/134; 525/139; 525/144

[58] Field of Search ................. 260/3.3; 525/134, 139, 525/144, 145; 264/137; 428/290, 537

[56] References Cited

U.S. PATENT DOCUMENTS

| | | | |
|---|---|---|---|
| 2,413,163 | 12/1946 | Bacon | 260/3.3 |
| 3,644,570 | 2/1972 | Jeffreys | 525/144 |
| 3,929,526 | 12/1975 | Koyama | 525/134 |

FOREIGN PATENT DOCUMENTS

| | | |
|---|---|---|
| 48-88176 | 11/1973 | Japan. |
| 52-138542 | 11/1977 | Japan. |
| 53-6383 | 1/1978 | Japan. |
| 53-99277 | 8/1978 | Japan. |
| 53-108153 | 9/1978 | Japan. |
| 53-127573 | 11/1978 | Japan. |

*Primary Examiner*—Allan Lieberman
*Attorney, Agent, or Firm*—Wenderoth, Lind & Ponack

[57] ABSTRACT

This invention relates to a cured novolak fiber-reinforced, chlorinated rubber molded article having excellent flameproofness, the main components of which are
(A) fibers or a fibrous structure containing at least 50 weight % of cured novolak fibers and
(B) a rubber composition consisting mainly of chlorinated rubber as a rubber component, the content of said fibers or fibrous structure being 2–80% by weight; and a process for the preparation of said article comprising adhering an organic solvent solution or dispersion of the rubber composition (B) to the fibers or the fibrous structure (A) or impregnating the fibers or fibrous structure with said solution or dispersion, or mixing the fibers with the rubber composition (B), and without any further processing, or during or after the pressing or molding, vulcanizing said chlorinated rubber composition at a temperature of 100°–200° C.

15 Claims, No Drawings

4,316,969

CURED NOVOLAK FIBER-REINFORCED, CHLORINATED RUBBER MOLDED ARTICLES HAVING EXCELLENT FLAME-PROOFNESS, AND PROCESS FOR THE PREPARATION THEREOF

This invention relates to cured novolak fiber-reinforced, chlorinated rubber molded articles. Cured novolak fiber is an amorphous, unoriented polymer having a three-dimensional cross-linked structure, insoluble and infusible, and has excellent flame retardant properties, heat resistance and chemical resistance because of its carbon content of nearly 80%. With the more stringent requirement for flame retardancy and the strengthened limitation on the use of asbestos in recent years, cured novolak fibers have begun to be widely used as, for example, flameproofing cloths, reinforcing materials for heat-resistant composite materials, materials for electric cables, sheets for industrial use, and packings.

Composite materials, such as thermal insulators, laminated sheets, laminated products, tanks and pipes, are manufactured by a variety of molding methods by using cured novolak fibers or a fibrous structure containing cured novolak fibers as reinforcing materials, and phenolic resins, epoxy resins, unsaturated polyester resins, furan resins, or polyester, polyethylene, or nylon as matrixes. The extremely good "wetting" properties between the cured novolak fibers as reinforcing materials and matrixes provide the products which are excellent in heat resistance, chemical resistance and electrical properties, as well as in flame retardant properties. In a blend with rubber, however, it has not been possible to obtain any such flexible tubes, packing or sheets as can show rubber elasticity, because when they are vulcanized with a sulfur vulcanizing agent, for example, a vulcanizing agent of sulfone series, the cured novolak fibers or the fibrous structures containing cured novolak fibers react with the vulcanizing agent and their physical properties are impaired, resulting in the production of hard and brittle molded products and making it impossible to obtain, flexible tubes, packings and sheets, having rubber elasticity. As natural and ordinary synthetic rubbers are inflammable, it is not very effective for improving their flame retardant properties to reinforce them with cured novolak fibers or fibrous structures containing such fibers. While silicone rubber is, on the other hand, excellent in heat resistance and flame retardant properties, its expensiveness precludes the practical use of this rubber in the manufacture of any molded product which requires it in a large quantity.

As a result of their energetic research with the aforementioned problems in mind, the inventors of this invention have found it possible to prepare, from cured novolak fibers or a fibrous structure containing such fibers, and chlorinated rubber, a molded article which is excellent in flameproofness, and has remarkably improved mechanical properties without the sacrifice of the rubber elasticity inherent in the chlorinated rubber.

It is, therefore, an object of this invention to provide a composite molded article of chlorinated rubber reinforced with cured novolak fibers or a fibrous structure containing such fibers, and having excellent flameproofness.

It is another object of this invention to provide a process for preparing a composite molded article of chlorinated rubber reinforced with cured novolak fibers or a fibrous structure containing such fibers, and having excellent flameproofness.

Chlorinated rubber contains a considerably large quantity of hydrogen chloride, and often gains an additional amount of free hydrogen chloride during its molding or vulcanization with an organic peroxide which usually takes place at a temperature of 100° to 200° C. Therefore, the use of cotton, rayon, nylon, polyester, polyacrylonitrile, or the like as reinforcing materials is not suitable for the production of a flexible molded article as sought by this invention, not only because of the lower flameproofness of the resultant molded article, but also owing to the damage which the reinforcing material will be subjected to by the hydrogen chloride contained in chlorinated rubber or liberated during its molding or vulcanization.

Whereas the use of a glass fiber structure as reinforcing material makes it possible to produce a highly flameproof and heat-resistant molded article, in this case glass fibers become bare owing to the relatively poor wetting between glass fibers and chlorinated rubber, and particularly, the low flex wear resistance of a chlorinated rubber molded article reinforced with glass fibers renders it difficult to obtain a molded article having excellent rubber elasticity which is inherent in a processed rubber product.

If, on the other hand, cured novolak fibers (or a fibrous structure containing such fibers) according to this invention are used as reinforcing material, it is possible to obtain the desired molded article having a flexible hand, because the cured novolak fibers per se are entirely stable to hot concentrated hydrochloric acid and are not damaged by the hydrogen chloride contained in chlorinated rubber or liberated during its molding or vulcanization with an organic peroxide, metallic oxide or amine. It is, however, important to avoid the use of a sulfur- or sulfone-vulcanizing agent ordinarily used for the vulcanization of rubber, because it does damage to cured novolak fibers during the heat treatment at the time of molding, resulting in the production of only a hard and brittle molded article.

The cured novolak fibers applicable to this invention are obtained by curing with aldehyde by the below-described method. The as-spun novolak fibers which are prepared by melt-spinning novolak resin have a number-average molecular weight of preferably 500 to 2,000, and the details are given for example, in U.S. Pat. Nos. 3,650,102 and 3,628,995. For example, as-spun novolak fibers are immersed in a mixed aqueous solution containing usually 12 to 20 weight% of hydrochloric acid and 7 to 20 weight% of formaldehyde and treated for two to 10 hours at a temperature of 90° to 100° C., by raising temperatures gradually from around room temperature to a temperature of 90° to 100° C. Alternatively, fibers may be immersed in the aforementioned mixed aqueous solution, heated up gradually to a temperature of 90° to 100° C., treated for 10 to 180 minutes at a temperature of 90° to 100° C., and further treated at a temperature of 70° to 95° C. for 10 to 180 minutes in a mixed aqueous solution containing usually 0.5 to 5 weight% of ammonia and 10 to 40 weight% of formaldehyde. In either of these curing treatments, the degree of curing should be such that the novolak fibers show a weight increase of 5 to 20%, preferably 8 to 15%, after curing, and if the weight increase by curing is less than 5.0%, the novolak fibers are very likely to contain uncured novolak resin, while a weight increase over 20% can mean the growth of a great deal of methylol groups and the like in the fibers, with a resultant lowering of the various properties of the cured novolak fibers.

The cured novolak fibers thus obtained may be treated with an aqueous solution of methanol, ethanol, etc. in order to remove any acid, salt or other impurities contained in the fibers and improve their fibrous elongation.

The results of the research by the inventors of this invention indicate that the molded article the main components of which are (A) fibers or a fibrous structure containing at least 50 weight% of the aforementioned cured novolak fibers, and (B) a rubber composition consisting mainly of chlorinated rubber as a rubber component, the content of said fibers or fibrous structure being 2 to 80% by weight, provides a cured novolak fiber-reinforced chlorinated rubber molded article which is excellent in flameproofness and possesses remarkably improved physical and mechanical properties, afer the chlorinated rubber is vulcanized (cured) with an organic peroxide, metallic oxide or amine.

In this invention, it is possible to use the aforementioned fibers as reinforcing materials in the form of either rovings or short fibers cut therefrom to appropriate length, but short fibers having a length of 1 to 20 mm, especially 1 to 10 mm, may advantageously be used, because they can easily be mixed uniformly with a rubber composition consisting mainly of chlorinated rubber as a rubber component, or its organic solvent solution or dispersion, and permits the production of a molded article having excellent physical and mechanical properties.

In this invention, it is also possible to use a fibrous structure of the aforementioned fibers as reinforcing material, and suitable examples of such a fibrous structure include spun yarn, fabrics such as knits and nonwoven fabrics, or paper. Fabrics and paper are particularly suitable.

The fibers or fibrous structures used as the reinforcing materials in this invention may consist solely of the aforementioned cured novolak fibers, or may consist of a blend of cured novolak fibers with, for example, cotton, rayon, organic fibers comprising polyolefins such as vinyl chloride resin and polypropylene, polyesters such as polyethylene terephthalate, polyamides such as 6-nylon and 6,6-nylon, aromatic polyamides such as poly-m-xylyleneisophthalamide and poly-p-phenyleneterephthalamide, polyimidazoles such as polybenzimidazole, and polyamideimide, or inorganic fibers, including asbestos, ceramic fibers, glass fibers and metallic fibers such as steel fibers; or the nonwoven fabrics or paper thereof; or the yarn obtained by mix spinning two or more of them; or knit fabrics obtained by mix spinning or combining them.

Any such fibers or fibrous structures should, however, contain at least 50 weight% of the aforementioned cured novolak fibers, and those which contain at least 70 weight%, preferably at least 80 weight%, of cured novolak fibers are particularly suitable. The heat resistance and flameproofness of the fibers or fibrous structures as a whole are remarkably improved if they contain at least 50 weight%, preferably at least 70 weight%, of cured novolak fibers as stated above.

A known organic bonding agent may be used to bind cured novolak fibers with each other or with any such other fibers as mentioned above, in order to prepare the aforementioned nonwovens or paper.

Reduction in the content of cured novolak fibers in the reinforcing fibers or fibrous structures often causes the lowering of one or more of flameproofness, heat resistance, resistance to chemicals, electrical characteristics, flexing properties and flexibility of the resultant molded article.

The percentage of the fibers or the fibrous structure thereof containing cured novolak fibers in a molded article to be applied to this invention depends on the work object and shape of the molded article, but is usually 2 to 80 weight% based on the total weight of the molded article, and preferably the content of the cured novolak fibers ranges from 10 to 60 weight%.

A molded article containing the aforementioned range of cured novolak fibers is easy to mold, and the molded article thus obtained is excellent in dimensional stability, flameproofness, heat resistance and resistance to chemicals, and possesses a soft hand. With less than 2 weight% of fibers, molding is very difficult, and the fibers are of little effect in dimensionally stabilizing and reinforcing the molded article. A fiber content in excess of 80 weight%, however, makes it difficult to cover the surfaces of the fibers or fibrous structure containing at least 50 weight% of cured novolak fibers uniformly with chlorinated rubber, resulting in the production of unevenly covered sheets, tubes or the like.

The chlorinated rubber applicable to this invention is usually a resin containing 15 to 50 weight% of chlorine and having rubber elasticity, but it preferably contains 25 to 35 weight% of chlorine in order to develop flameproofness and retain its rubber elasticity. If the chlorine content is less than 15 weight%, a resultant molded article has only a poor flameproofness, while a chlorine content in excess of 50 weight% produces a hard and brittle molded article.

The chlorinated rubber or chlorine-containing rubber, applicable to this invention may be either an elastomer containing chlorine atoms and obtained by polymerization of chlorine-containing monomers, or one obtained by polymerization of monomers containing no chlorine atom, followed by chlorination or introduction of radicals containing chlorine atoms, such as chlorosulfonic radicals. For example, it is possible to use chloroprene rubber, chlorinated polyethylene, chlorosulfonated polyethylene, chlorinated polypropylene, chlorinated polyisoprene, chlorinated butyl rubber, or a mixture of two or more thereof, of which chlorinated polyethylene is the most suitable in view of the ease of handling and processing.

While room temperature vulcanization is possible, the chlorinated rubber applicable to this invention is usually vulcanized by using 0.1 to 5 weight%, preferably 0.5 to 3.0 weight%, of an organic peroxide, such as 1,1-bis(t-butyl)peroxy 3,3,5-trimethylcyclohexane, benzoyl peroxide, t-butylperoxyisopropyl carbonate, dicumyl peroxide, t-butylcumyl peroxide, methyl ethyl ketone peroxide, and cumene hydroperoxide, a metallic oxide such as lead oxide, zinc oxide and magnesium oxide, or an amine such as triethanolamine, and polyamine, of which the quantity is appropriately selected in accordance with the method of processing and the treatment conditions.

Further, the rubber composition applicable to this invention and consisting mainly of chlorinated rubber as a rubber component is not always used alone, but may be used with less than 50 weight% of, and preferably less than 35 weight% of any such additive as a vulcanization accelerator or auxiliary vulcanization accelerator such as p-quinone dioxime, p,p'-dibenzoylquinone dioxime, antimony trioxide, calcium oxide, stearic acid and diethylene glycol; a dispersant such as stearic acid, stearic esters, polyethylene glycol, and monoethanolamine; a softening or plasticizing agent such as phthalic esters, phosphoric esters, glycol esters, or linoleic acid, linolenic acid, oleic acid, rapeseed oil, peanut oil, epoxy resin, phenolic resin and vinyl chloride resin; a processing aid such as phthalic esters, phosphoric esters, linoleic acid, oleic acid, stearic esters, stearic acid, barium stearate, barium laurate and cadmium laurate; a lubricant such as stearic acid, stearic esters, polyethylene glycol, low molecular weight polyethylene and high-melting wax; an aging inhibitor such as p-phenylenediamine, phenolic resin, and microcrystalline wax; a vulcanization retarder such as phthalic anhydride and N-nitrosodiphenylamine; a tackifier such as p-t-butyl phenol, acetylene resin, phenolic resin, xylene-formaldehyde resin, terpene resin, and rosin; a hardening agent such as p-aminophenol and p-phenylenediamine; a foaming agent such as sodium bicarbonate, N,N'-dinitrosopentamethylenetetramine, azobisisobutyronitrile, and benzene sulfonyl hydrazide; a colorant such as titanium oxide, red oxide, chrome oxide, carbon black, ultramarine, toluidine red, phthalocyanine blue and phthalocyanine green; and a strengthening agent or filler such as calcium carbonate, calcium silicate, clay, talc, mica, carbon black, aluminum hydroxide, barium sulfate, asbestos, epoxy resin, phenolic resin, natural rubber, synthetic rubber, vinyl chloride resin and polyethylene.

The use of such additives in excess of 35 weight%, particularly 50 weight%, lowers the flameproofness and rubber elasticity of the composition and reduces its adhesiveness to the cured novolak fibers or cured novolak fibrous structure.

The rubber composition consisting mainly of chlorinated rubber as a rubber component and containing one or more of the aforementioned vulcanizing agents, plasticizers or stabilizers is mixed or put together with the fibers or fibrous structure used as reinforcing material in this invention, and is heated or molded under heat as it is, or alternatively, it is dissolved in solvent such as hydrocarbons, ketones, alcohols, esters and halogenated hydrocarbons, and applied in the form of a solution or dispersion (hereinafter exemplified by a paste) to fibers or fibrous structure as reinforcing material by immersion, coating, spraying or otherwise. Its good blending and processing characteristics permit the use of any method of application, such as coating, calendering, extrusion, immersion and spreading. A molded article such as paper, a sheet, a web, a hose, packing, a pipe or a plate obtained by any of the foregoing methods, should generally be heat treated (vulcanized) at a temperature of 100° to 200° C., but it is advantageously heated at a temperature of 140° to 200° C. under a pressure of 10 to 150 kg/cm² for 10 to 60 minutes in order to improve its gastightness, tensile strength and surface smoothness.

The preferred embodiments of the cured novolak fiber-reinforced chlorinated rubber molded articles of this invention will be described below separately for a case of using a fibrous structure and a case of using fibers as reinforcing material.

When a fibrous structure is used as reinforcing material, it is possible to advantageously manufacture a molded article by dissolving a composition consisting mainly of chlorinated rubber as a rubber component in a solvent, such as ketone or alcohol, in which chlorinated rubber is soluble, adding one or more of the aforementioned various additives if necessary, applying a solution or paste of chlorinated rubber containing a predetermined amount of a vulcanizer to the cured novolak fibrous structure by adhesion or impregnation, and then removing the solvent.

The adhesion or impregnation may be appropriately carried out by, for example, coating or spraying the chlorinated rubber solution or paste onto the fibrous structure, or immersing the fibrous structure in the solution or paste. Covering only one surface of the fibrous structure with chlorinated rubber can conveniently be effected by coating or spraying.

Removal of the solvent and vulcanization follow the adhesion or impregnation of the chlorinated rubber solution or paste on the fibrous structure. Removal of the solvent and vulcanization may be carried out at the same time or separately, but are preferably performed separately. That is, it is preferable that removal of the solvent is effected at a temperature from room temperature to 100° C., preferably not higher than approximately 80° C., under normal or reduced pressure, followed by vulcanizing at an appropriate vulcanization temperature of, say, 100° C. to 200° C. In this case, vulcanization may be carried out directly at the aforementioned temperature, or alternatively, by heating at the aforementioned temperature simultaneously with the molding or pressing operation, or thereafter. Pressing is advantageous for providing the resultant molded article with a smooth surface.

The foregoing process can advantageously manufacture the cured novolak fiber-reinforced chlorinated rubber molded article of this invention in the shape of a sheet, a hose, a laminate and the like.

The molded article thus obtained is provided, according to this invention, as a molded article having on one or both sides of a fibrous structure a rubber composition consisting mainly of chlorinated rubber as a rubber component.

The molded article of this invention having a rubber composition consisting mainly of chlorinated rubber as a rubber component on both sides thereof preferably contains 40 to 98 weight%, and particularly 50 to 90 weight%, of such a rubber composition based on the weight of the molded article if the fibrous structure is a fabric such as a knit or nonwoven fabric and 30 to 90 weight%, and particularly 40 to 80 weight%, of such a rubber composition if the fibrous structure is paper.

In case the molded article of this invention carries a rubber composition consisting mainly of chlorinated rubber as a rubber component on only one side thereof, the content of such a rubber composition in the range of 30 to 95 weight%, and particularly 40 to 90 weight%, of the molded article is preferable for a molded article in which the fibrous structure is of the above fabric, etc. and the preferable content of such a rubber composition is in the range of 20 to 90 weight%, particularly 30 to 80 weight% based on the weight of the molded article when the fibrous structure is paper.

It will be noted that a molded article having paper as its fibrous structure requires only a relatively small amount of a rubber composition consisting mainly of chlorinated rubber as a rubber component, because the dense structure of the paper per se limits the quantity of such a rubber composition which permeates into the paper.

On the other hand, the cured novolak fiber-reinforced chlorinated rubber molded article of this invention, when fibers containing at least 50 weight% of cured novolak fibers (hereinafter referred to simply as cured novolak fibers) are used as reinforcing material, may be manufactured by various processes as, for example, described below.

Firstly, there is a process in which a rubber composition consisting mainly of chlorinated rubber as a rubber component, cured novolak fibers and a vulcanizing agent are premixed together preferably in the solid state, and then melt mixed and molded in an extruder.

By this process, the melt-mixing is advantageously carried out at a temperature of 70° to 200° C., but the dwell time in the extruder should usually be as short as about 1 to 10 minutes, because vulcanization becomes likely to occur in the extruder if the dwell time is too long. Accordingly, it is desirable to further heat the molded article at a temperature of 100° to 200° C. for a predetermined time after extrusion in order to complete the vulcanization of the molded article.

Secondly, there is a process in which a rubber composition consisting mainly of chlorinated rubber as a rubber component and cured novolak fibers are premixed in the solid state, and melt-mixed in an extruder to prepare an unvulcanized composition containing no vulcanizing agent, which may be prepared in the form of powder, pellets or a sheet, if necessary, and then the unvulcanized composition is mixed with a vulcanizing agent, molded and vulcanized at the time of manufacturing a molded article.

The abovementioned melt-mixing in the extruder may be advantageously carried out at a temperature of 70° to 200° C. With no vulcanizing agent contained in the composition, its dwell time in the extruder does not need to be particularly shortened, but can be lengthened for full mixing.

The mixing of an unvulcanized composition with a vulcanizing agent may likewise be effected in the extruder, or it is equally possible to dissolve them in a solvent such as ketone or alcohol as mentioned before, to mix them in a solution or paste. If the mixing of the composition with the vulcanizing agent is effected in the extruder, the resultant mixture may be molded into a molded article in situ, and if necessary, it is further heated and vulcanized to thereby provide a molded article of this invention.

If, on the other hand, it is mixed with a vulcanizing agent in the form of a solution or paste, the mixture may first be heated at a lower temperature of, say, between room temperature and 100° C. to release the solvent and prepare an unvulcanized composition containing a vulcanizing agent. The removal of the solvent may be accomplished by changing the mixture into the form of powder, pellets, a film, sheet, or the like, or may also be done by spray drying, granulation drying, or otherwise.

The vulcanizer-containing unvulcanized composition is, then, molded and vulcanized to provide a cured novolak fiber-reinforced chlorinated rubber molded article of this invention.

The molding and vulcanization of the vulcanizer-containing unvulcanized composition are advantageously effected by melting in the extruder, or by heating and melting chips, pellets or powder of the unvulcanized composition containing a vulcanizing agent in a mold.

This process, which is characterized by the preparation of a preliminary unvulcanized composition formed from a rubber composition consisting mainly of chlorinated rubber as a rubber component and cured novolak fibers, is applicable to the manufacture of a molded article by preliminary manufacturing an unvulcanized composition having a high content of cured novolak fibers, if necessary mixing it with a chlorinated rubber composition, and also advantageously provides an unvulcanized composition which is convenient for preservation or storage.

Therefore, it is possible to make a cured novolak fiber-reinforced chlorinated rubber molded article according to this invention by, for example, dissolving the foregoing unvulcanized composition in a solvent again and mixing it with a vulcanizing agent to prepare a solution or paste thereof, applying this solution or paste onto the aforementioned fibrous structure by adhesion or impregnation, and vulcanizing the unvulcanized composition.

The molded article thus obtained is one in which a chlorinated rubber composition containing cured novolak fibers is integrated with a cured novolak fibrous structure.

Thirdly, there is a process in which a rubber composition consisting mainly of chlorinated rubber as a rubber component is dissolved in a solvent such as ketone or alcohol as mentioned before to provide a solution or paste thereof, and this solution or paste is mixed with a vulcanizing agent and cured novolak fibers, followed by removal of the solvent, molding and vulcanizing.

The removal of the solvent may be accomplished in the form of powder, pellets, a film or sheet, or the like, or may also be effected by spray drying or otherwise, as stated before. Likewise, the molding and vulcanization of the mixture may be carried out in the extruder, or by heating in a press or mold, as mentioned above.

The molded article can also be obtained by applying the aforementioned solution or paste to the cured novolak fibrous structure by adhesion or impregnation, removing the solvent, and vulcanizing.

According to any of the three modes of manufacture using cured novolak fibers as reinforcing material, it is easy to manufacture a molded product in any of a variety of articles, including a sheet, a hose, a laminate or other shaped articles, because the cured novolak is used in the fibrous form as the reinforcing material, and hence, it can be uniformly mixed with a rubber composition consisting mainly of chlorinated rubber as a rubber component.

The molded article of this invention thus obtained can contain 20 to 98 weight%, particularly 40 to 90 weight%, of a rubber composition consisting mainly of chlorinated rubber as a rubber component, based on the weight of the whole molded article.

This invention will now be described in further detail with reference to several examples, in which the values of the various physical properties involved were determined in the following ways, respectively, unless otherwise noted:

(1) Number-Average Molecular Weight

Novolak resin was dissolved in acetone and its number-average molecular weight was determined by osmometry at 20° C.

(2) Flameproofness:

It was determined by the method of JIS K-7201, applying in modification ASTM D 2863-70. The tests were conducted three times and the average value of the test results [Limited Oxygen Index (L.O.I.)] obtained by the following formula:

$$L.O.I. (\%) = \frac{[O_2]}{[O_2] + [N_2]} \times 100$$

wherein

[$O_2$] = Flow rate of oxygen (l/min.) [$N_2$] = Flow rate of nitrogen (l/min.)

(3) Flex Wear Resistance

It was determined in accordance with A-2 Method (Flex Method) of JIS 1079, 6.15.1 (2).

(4) Tensile Strength

With the use of an Instron tensile tester, a specimen, 5 mm wide, 50 mm long (clamp distance) was tested at a stress rate of 100% min in an atmospheric of temperature 20° C. and 65% (RH).

(5) Volume Resistivity

It was determined in accordance with the method of ASTM D-648.

EXAMPLE 1

(1) Novolak resin having a number-average molecular weight of 870 was melt-spun at a temperature of 146° C., and immersed in a mixed aqueous solution of 17.5 weight% of hydrochloric acid and 17.5 weight% of formaldehyde at room temperature. Temperature was gradually raised to 92° C. in three hours and then 91° to 93° C. was maintained for one hour. After the washing with water, the treatment was given at a temperature of 90° C. for two hours in an aqueous solution of 2.0 weight% of ammonia and 20 weight% of formaldehyde. The novolak fibers thus cured were immersed in 1.5 weight% of ammonia water and treated at a temperature of 70° C. for two hours, and showed a weight increase of 10.8 weight% based on the uncured novolak fibers. The denier was 2.51 d, tensile strength 1.68 g/d and elongation 44%. The cured novolak fibers thus obtained were spun into a No. 20 (cotton count) two-ply yarn and with three spun yarns was obtained a plain weave of 210 g/m² in weight and 0.55 mm in thickness.

(2) On the other hand, a mixture containing 65 weight% of chlorinated polyethylene, 25 weight% of carbon black, 1 weight% of stearic acid, 5 weight% of vinyl chloride resin, 2 weight% of silica and 2 weight% of 1,1-bis(t-butyl peroxy) 3,3,5-trimethylcyclohexane was dissolved in a mixed solvent consisting of 80 weight% of toluene and 20 weight% of methyl ethyl ketone, whereby a paste containing 50 weight% in concentration of the mixture was prepared.

(3) The aforementioned plain weave of cured novolak fibers were coated with predetermined quantities of the foregoing paste, dried, laminated and hot pressed for 60 minutes at a temperature of 180° C. and pressure of 1 to 160 kg/cm² to thereby produce a variety of sheets 1–10 mm thick containing respectively the contents of cured novolak fibers as listed in Table 1.

Table 1 shows the number of the laminates of the cured novolak fabrics, the content of the cured novolak fibers contained in the sheet, the thickness of the sheet, the values of the tensile strength obtained by converting those as measured to the values per unit cross-sectional area, and the molding properties of the sheet.

TABLE 1

| Number of laminates | Content of cured novolak fibers (weight %) | Thickness of sheets (mm) | Tensile strength (kg/cm²) | Molding properties |
|---|---|---|---|---|
| 1 | 1.3 | 10 | 90 | Poor |
| 1 | 2.7 | 5 | 105 | Relatively poor |
| 1 | 16.8 | 1 | 205 | Good |
| 3 | 10.1 | 5 | 165 | " |
| 5 | 16.3 | 5 | 185 | " |
| 10 | 34.6 | 5 | 190 | " |
| 10 | 48.5 | 5 | 195 | " |
| 15 | 56.8 | 5 | 180 | Uneven |
| 20 | 72.8 | 5 | 210 | Very uneven |

Referring to Table 1, the oozing or run-off of the paste made it extremely difficult to apply the paste onto one plain weave of cured novolak fibers up to 10 mm of thickness and press it under heat. On the other hand, a 5 mm thick sheet molded from 20 pieces of plain weave was found to possess a sufficiently high mechanical strength to be fully useful as a molded article, though it was coated very unevenly with a part of its coating peeled off and its molding properties were somewhat poor.

EXAMPLE 2

(1) Novolak resin having a number-average molecular weight of 920 was melt-spun at a temperature of 150° C., and the novolak fibers as spun were immersed in an aqueous solution of 18.0 weight% of hydrochloric acid and 16.0 weight% of formaldehyde and temperature was raised gradually from room temperature to 96° C. in four hours. After the fibers were held at that temperature for five hours and then washed with water, they were treated at 60° C. for 120 minutes in an aqueous solution of 40 weight% of methanol and 2.0 weight% of ammonia, whereby the novolak fibers were cured. The cured novolak fibers thus obtained showed a weight increase of 13.6 weight% over the uncured fibers. The denier was 2.01 d, tensile strength 1.72 g/d and elongation 58%. These cured novolak fibers were spun with rayon to prepare six kinds of No. 20 two-ply spun yarns containing 100, 80, 70, 55, 40 and 0 weight% of the cured novolak fibers. Then, six kinds of plain weaves having a unit weight of 155 to 160 g/m² were made by using those spun yarns of the same kind as warp and weft.

(2) A mixture containing 73 weight% of chlorinated polyethylene, 20 weight% of carbon black, 0.75 weight% of stearic acid, 2.5 weight% of 1,1-bis(t-butyl peroxy)3,3,5-trimethylcyclohexane, 1.25 weight% of p-quinonedioxime and 2.5 weight% of zinc white was dissolved in a mixed solvent consisting of 85 weight% of toluene and 15 weight% of methyl ethyl ketone to prepare a paste containing 50 weight% in concentration of the foregoing mixture.

(3) The paste thus obtained was applied on the aforementioned six kinds of fabrics at a temperature of 100° C. by using a spreader, and after they were dried, the fabrics and the paste applied thereon were subjected to topping in a calendar. Then, they were hot pressed for 40 minutes at a temperature of 180° C. and pressure of 120 kg/cm² to prepare 0.4 mm thick sheets having a unit weight of 580 to 620 g/m². Table 2 shows the flameproofness (L.O.I.), tensile strength and apparent appearance of each of the molded articles thus obtained.

TABLE 2

| Ser. No. of molded article | Content of cured novolak fibers in plain weave contained (weight %) | Flame-proofness (L.O.I.) (%) | Tensile strength (kg/cm²) | Apparent shape of molded article |
|---|---|---|---|---|
| 1 (Example) | 100 | 36 | 15.8 | Soft |
| 2 (Example) | 80 | 35 | 14.3 | " |
| 3 (Example) | 70 | 33 | 12.1 | " |
| 4 (Example) | 55 | 31 | 8.6 | Somewhat hard |
| 5 (Comparative Example) | 40 | 28 | 5.8 | Hard |
| 6 (Comparative Example) | 0 | 26 | 3.6 | Hard and brittle |

EXAMPLE 3

(1) The cured novolak fibers obtained in Example 2 were cut into an average fiber length of 6 mm, and 50 weight% of the thus cut fibers were mixed with the paste of Example 1 followed by pre-vulcanizing at a temperature of 120° C. for 60 minutes. The preform thus obtained was placed in a mold measuring 5×10×80 mm and hot pressed for 40 minutes at a temperature of 160° C. and pressure of 80 kg/cm² to prepare a molded article. Likewise, two other molded articles were prepared, which, however, contained chlorosulfonated polyethylene or chloroprene respectively, in place of chlorinated polyethylene in Example 1. On the other hand, for comparison, individual molded articles were obtained by mixing 50 weight% of the cured novolak fibers the same as above with a paste adjusted by using in place of the chlorinated polyethylene in Example 1 natural rubber, butadiene rubber, nitrile rubber and styrene-butadiene rubber, respectively, and by using in place of 1,1-bis(t-butyl peroxy)3,3,5-trimethylcyclohexane lead oxide in both cases in which chlorosulfonated polyethylene and chloroprene rubber were used and sulfur in case other rubbers were used.

Table 3 shows the flameproofness and shape of each of the molded articles obtained.

TABLE 3

| Ser. No. of molded article | Rubber | Hardening agent | Flame-proofness* | Shape |
|---|---|---|---|---|
| 1 (Example) | Chlorinated polyethylene | 1,1-bis(t-butyl peroxy)3,3,5-trimethylcyclohexane | ⊚ | Soft |
| 2 (Example) | Chlorosulfonated polyethylene | Lead oxide | O | " |
| 3 (Example) | Chloroprene rubber | " | O | " |
| 4 (Comparative Example) | Natural rubber | Sulfur | X | Hard |
| 5 (Comparative Example) | Butadiene rubber | " | " | " |
| 6 (Comparative Example) | Nitrile rubber | " | X | " |
| 7 (Comparative Example) | Styrene-butadiene rubber | " | X | " |

TABLE 3-continued

| Ser. No. of molded article | Rubber | Hardening agent | Flame-proofness* | Shape |
|---|---|---|---|---|
| Example) | rubber | | | |

Flameproofness
⊚ Does not burn even in a match flame.
O Burns for 0 to 2 sec. after it is moved away from a match flame.
X continues to burn well even after a match flame is moved away.

EXAMPLE 4

A paste as prepared in Example 1 was spread on a plain weave of cured novolak fibers as obtained in Example 1 and on a plain weave of glass fibers having a unit weight of 440 g/m² and a thickness of 0.50 mm, and two sheets each having a thickness of 1.0 mm were obtained by molding as thickness of 1.0 mm were obtained by molding as in Example 1.

Table 4 shows the unit weight and flex wear tests of each of the sheet reinforced with a cured novolak fiber plain weave and the sheet reinforced with a glass fiber plain weave fabric (Comparative Example).

TABLE 4

| Ser. No. of molded article | Kind of reinforcing material | Unit weight of sheet (g/m²) | Flex wear (time of flexing) |
|---|---|---|---|
| 1 (Example) | Plain weave of cured novolak fibers | 870 | 4,780 |
| 2 (Comparative Example) | Plain weave of glass fibers | 1,140 | 180 |

EXAMPLE 5

(1) Paper of cured novolak fibers having a unit weight of 50 g/m² and an apparent thickness of 0.25 mm was made by using a P.P.S. type sheet machine (made by Toyo Seiki, Japan) from a slurry having a fiber concentration of 0.2 weight% obtained by dispersing in water the cured novolak fibers of Example 1 cut into an average fiber length of 6 mm and an approximately 0.2 weight% emulsion of vinyl chloride resin, followed by dehydration, drying, and hot pressing at a temperature of 100° C. and a pressure of 5 kg/cm². The paper thus obtained contained approximately 90 weight% of cured novolak fibers based on the total weight of the paper.

(2) A mixture containing 85 weight% of chlorinated polyethylene, 5 weight of calcium carbonate, 3 weight% of zinc white, 2 weight% of phthalic anhydride, 1.5 weight% of methyl stearate, 2 weight% of titanium oxide and 1.5 weight% of p-phenylenediamine was kneaded in an extruder and dissolved in toluene to prepare a solution containing 10 to 40 weight% in concentration of the mixture. Then, 1.5 weight% of methyl ethyl ketone peroxide based on the weight of the mixture was added whereby a rubber cement was obtained.

(3) The paper obtained at (1) was coated with the rubber cement of (2), dried at room temperature for 24 hours, and then heat treated at a temperature of 100° C. for 10 minutes, whereby the rubber substance was vulcanized.

Table 5 shows a variety of kinds of rubber-coated paper which were obtained, the content in each paper of a rubber composition consisting mainly of chlorinated rubber as a rubber component, the content in each paper of cured novolak fibers which was obtained by calculation, the presence or absence of a flame remaining on the rubber-coated surface of each paper after it was directly contacted with a lighter flame, and the condition and effect of gas welding sparks dropped from a distance of 20 cm onto the rubber-coated surface of each paper inclined at an angle of 45 degrees for one minute continuously.

TABLE 5

| Ser. No. of molded article | Rubber content (weight %) | Cured novolak fiber content (weight %) | Unevenness of rubber coating | Flame remaining after its removal | Condition and effect of continuously dropped welding sparks |
|---|---|---|---|---|---|
| 1 (Example) | 97.0 | 2.7 | Slightly uneven | Immediately flamed out. | Sparks slipped down. |
| 2 (Example) | 86.1 | 12.5 | Even | Immediately flamed out. | Sparks slipped down. |
| 3 (Example) | 77.1 | 20.6 | Even | Immediately flamed out. | Sparks slipped down. |
| 4 (Example) | 64.0 | 32.4 | Even | Immediately flamed out. | Sparks slipped down. |
| 5 (Example) | 37.4 | 56.3 | Even | Immediately flamed out. | Sparks slipped down. |
| 6 (Example) | 25.0 | 67.5 | Slightly uneven | Flamed out after about 1 sec. | Some sparks adhered. |
| 7 (Comparative Example) | 8.1 | 82.7 | Very uneven | Flamed out after about 2 sec. | Lots of sparks adhered. |
| 8 (Comparative Example) | 0 | 90.0 | — | Flamed out after about 2 sec. | Lots of sparks adhered and some penetrated paper. |

EXAMPLE 6

A mixture containing 85 weight% of chlorinated polyethylene, 5 weight% of calcium carbonate, 3 weight% of zinc white, 2 weight% of phthalic anhydride, 1.5 weight% of methyl stearate, 2 weight% of titanium oxide, and 1.5 weight% of p-phenylenediamine was mixed with 3 weight% of 1,1-bis(t-butyl peroxy)3,3,5-trimethylcyclohexane based on the weight of the above mixture. The resultant mixture (I) was further mixed with 30 weight% based on the weight of the mixture (I) of the short fibers obtained by cutting the cured novolak fibers used in Example 1 into a length of 2 mm, and then, the mixture was extrusion molded with an extruder maintained at a temperature of 90° C. to form a 5 mm thick flat plate.

This flat plate was heat treated at 180° C. for 10 minutes. The physical properties of this flat plate are shown in Table 6.

Likewise, a number of other 5 mm thick flat plates were prepared by using, instead of cured novolak fibers, glass fibers, asbestos, 1.5 denier 6,6-nylon fibers, 1.5 denier polyethylene terephthalate (PET) fibers, 2 denier rayon fibers and cotton fibers, respectively. Moreover, a flat plate consisting only of a chlorinated polyethylene mixture was prepared without using any cured novolak fibers.

The physical properties of these flat plates are also shown in Table 6.

TABLE 6

| Ser. No. of flat plate | Short fibers used | Tensile strength (kg/cm$^2$) | Volume resistivity (Ω-cm) Before boiling | After boiling |
|---|---|---|---|---|
| 1 (Example) | Cured novolak fibers | 260 | $1 \times 10^{14}$ | $1 \times 10^{14}$ |
| 2 (Comparative Example) | Glass fibers | 180 | $1 \times 10^{13}$ | $1 \times 10^{10-11}$ |

TABLE 6-continued

| Ser. No. of flat plate | Short fibers used | Tensile strength (kg/cm$^2$) | Volume resistivity (Ω-cm) Before boiling | After boiling |
|---|---|---|---|---|
| 3 (Comparative Example) | Asbestos | 100 | $1 \times 10^9$ | $1 \times 10^{7-8}$ |
| 4 (Comparative Example) | 6,6-nylon fibers | 35 | $1 \times 10^{10}$ | $1 \times 10^{8-9}$ |
| 5 (Comparative Example) | PET fibers | 30 | $1 \times 10^{10}$ | $1 \times 10^{7-8}$ |
| 6 (Comparative Example) | Rayon fibers | 30 | $1 \times 10^8$ | $1 \times 10^{6-7}$ |
| 7 (Comparative Example) | Cotton fibers | 25 | $1 \times 10^8$ | $1 \times 10^{6-7}$ |
| 8 (Comparative Example) | (None) | 75 | $1 \times 10^{14}$ | $1 \times 10^{13}$ |

EXAMPLE 7

A rubber sheet having a unit weight of 420 g/m$^2$ was prepared by coating a plain weave of cured novolak fibers having a unit weight of 210 g/m$^2$ and a thickness of 0.55 mm as used in Example 1, (1) with a solution of a chlorinated polyethylene mixture as used in Example 5, and hot pressing it at a temperature of 160° C. and a pressure of 20 kg/cm$^2$ for 20 minutes.

The rubber sheet thus obtained was heated for one hour in an air-filled oven having a temperature of 250° C. to determine its heat shrinkage, and also left in contact with a flame for 10 seconds to ascertain its shrinkage. The results are shown in Table 7.

A number of other plain weaves each having a unit weight and thickness substantially equal to those of the fabrics mentioned above were prepared from poly-m-phenylene isophthalamide (PMIA) fibers, 6-nylon, 12-nylon, 610-nylon, polyethylene terephthalate (PET), acrylic fibers, wool and cotton, respectively, and a number of rubber sheets were likewise obtained therefrom for comparison purposes. Heat shrinkages of these rubber sheets and shrinkages after flame contact are also shown in Table 7.

TABLE 7

| Ser. No. of rubber sheet | Kind of fibers of plain weave fabrics used | Heat shrinkage* after 1 hr. at 250° C. (%) | Shrinkage* after flame contact (%) |
|---|---|---|---|
| 1 (Example) | Cured novolak fibers | 98.8 | 96.2 |
| 2 (Comparative Example) | PMIA fibers | 92.4 | 75.0 |
| 3 (Comparative Example) | 6-nylon | 50 | ** |
| 4 (Comparative Example) | 12-nylon | 57 | ** |
| 5 (Comparative Example) | 610-nylon | 70 | ** |
| 6 (Comparative Example) | PET | 82 | ** |
| 7 (Comparative Example) | Acrylic fibers | 88 | ** |
| 8 (Comparative Example) | Wool | 48 | ** |
| 9 (Comparative Example) | Cotton | 85 | ** |

*% represents the percentage of the length of each rubber sheet subjected to heat treatment or contact with flame, relative to that prior to such heat treatment or flame contact.
**Blocks were formed by burning or fusion and determination of shrinkage was impossible.

What is claimed is:

1. A cured novolak fiber-reinforced, chlorine-containing rubber molded article, the main components of which are
   (A) fibers or a fibrous structure containing at least 50 weight % of cured novolak fibers and
   (B) a rubber composition consisting essentially of chlorine-containing rubber containing 15 to 50 weight % of chlorine as a rubber component, which is vulcanized with a non-sulfur vulcanizing agent,
   the content of said fibers or fibrous structure being 2-80% by weight of the molded article.

2. A molded article as set forth in claim 1 in which said fibers or fibrous structure contains at least 70 weight% of cured novolak fibers.

3. A molded article as set forth in claim 1 in which said fibrous structure comprises yarn, fabric, or paper.

4. A molded article as set forth in claim 1 in which said rubber composition contains at least 50 weight% of said chlorine-containing rubber.

5. A molded article as set forth in claim 1 in which said rubber composition contains at least 65 weight% of said chlorine-containing rubber.

6. A molded article as set forth in claim 1 in which said chlorine-containing rubber is vulcanized with an organic peroxide, metallic oxide or amine.

7. A molded article as set forth in claim 1 in which said chlorine-containing rubber is chlorinated polyethylene.

8. A molded article as set forth in claim 1 in which said cured novolak fibers are insoluble and infusible novolak fibers in which as-spun fibers obtained by melt-spinning novolak resin are treated with aldehyde and cured.

9. A molded article as set forth in claim 1 or 2 in which said fibers are fibers having a length of 1 to 20 mm.

10. A molded article as set forth in claim 1 in which the content of cured novolak fibers is 10-60% by weight of the molded article.

11. A process for preparing a cured novolak fiber-reinforced, chlorine-containing rubber article comprising
    contacting a rubber composition consisting essentially of a chlorine-containing rubber which contains 15-50 weight % of chlorine as a rubber component with fibers or a fibrous structure containing at least 50 weight % of cured novolak fibers, and
    pressing or molding the resultant composition before, during or after vulcanizing said chlorine-containing rubber composition with a non-sulfur vulcanizing agent at a temperature of 100°-200° C.

12. A process as set forth in claim 11, wherein said process comprises adhering an organic solvent solution or dispersion of said rubber composition to said fibers or fibrous structure.

13. A process as set forth in claim 11, wherein said process comprises impregnating said fibers or fibrous structure with an organic solvent solution or dispersion of said rubber composition.

14. A process as set forth in claim 11, wherein said process comprises mixing said fibers containing at least 50 weight % of cured novolak fibers with said rubber composition.

15. A process as set forth in claim 11 in which said rubber composition consisting essentially of a chlorine-containing rubber as a rubber component contains a vulcanizing agent consisting mainly of an organic peroxide, metallic oxide, or amine.

* * * * *